No. 789,591. PATENTED MAY 9, 1905.
F. DAVIS.
DENTAL APPLIANCE.
APPLICATION FILED NOV. 28, 1904.

Witnesses
C. Munter
C. H. Griesbauer

Inventor
Freeman Davis
by H. B. Willson
Attorney

No. 789,591.                                                Patented May 9, 1905.

UNITED STATES PATENT OFFICE.

FREEMAN DAVIS, OF MOULTON, IOWA.

DENTAL APPLIANCE.

SPECIFICATION forming part of Letters Patent No. 789,591, dated May 9, 1905.

Application filed November 28, 1904. Serial No. 234,621.

*To all whom it may concern:*

Be it known that I, FREEMAN DAVIS, a citizen of the United States, residing at Moulton, in the county of Appanoose and State of Iowa, have invented certain new and useful Improvements in Dental Appliances; and I do declare the following to be a full, clear, and exact description of the invention, such as will enable others skilled in the art to which it appertains to make and use the same.

My invention relates to improvements in dental appliances, and more particularly to a device for separating teeth and a matrix for use in connection with the separator.

The object of my invention is to provide a simple, durable, convenient, and efficient appliance of this character which will greatly facilitate the operation of filling approximal cavities in anterior teeth.

With the above and other objects in view the invention consists of certain novel features of construction, combination, and arrangement of parts, as will be hereinafter described and claimed.

Figure 1:
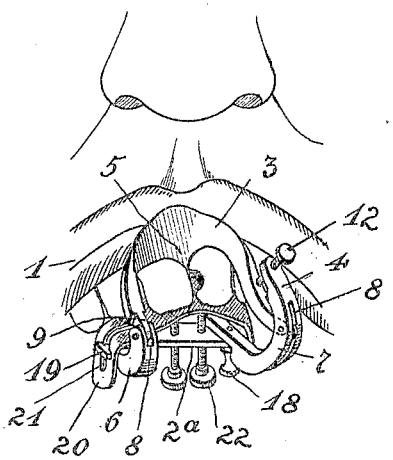
Figure 6:
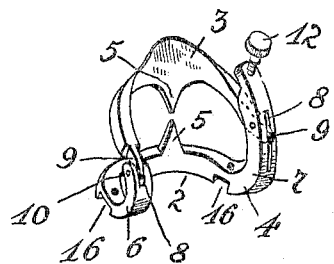
Figure 2:
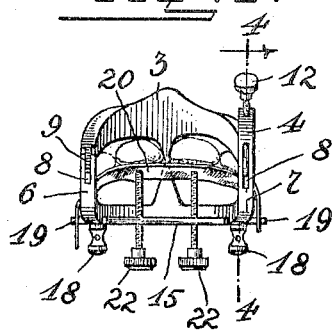
Figure 3:
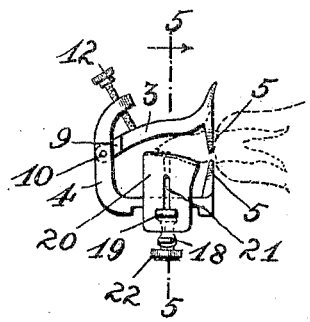
Figure 4:
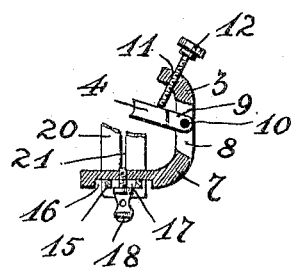
Figure 5:
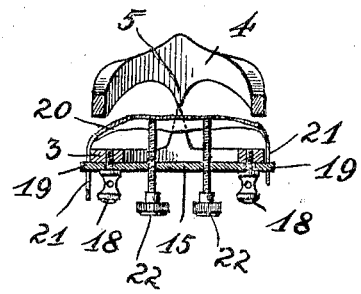

In the accompanying drawings, Figure 1 is a perspective view showing the application of my improved separator and matrix. Fig. 2 is a front elevation of the appliance. Fig. 3 is an end elevation of the same. Figs. 4 and 5 are detail sectional views taken on the lines 4 4 and 5 5 in Figs. 2 and 3, and Fig. 6 is a perspective view of the appliance with the matrix removed to permit the former to be used simply as a tooth-separator.

Referring to the drawings by numeral, 1 denotes my improved dental appliance, which, as shown in Fig. 1 of the drawings, is applied to the anterior teeth of a human jaw. The appliance comprises a separator 2 and a matrix $2^a$, which is removably and adjustably mounted upon the separator. The latter consists of two pivotally-connected members 3 and 4, which are substantially U-shaped in form, and each of which is formed adjacent to its center with a tapered or wedge-shaped jaw 5. These jaws 5 are adapted to enter or to be forced between two adjacent teeth in order to temporarily separate the same to facilitate the filling of cavities therein. The member 4 is formed with arms 6 and 7, which project substantially at right angles to the body portion of the member 4 and which are formed with slots 8 to receive the reduced ends 9 of the member 3. Said reduced ends 9 are pivoted in the slots 8 by means of pins 10, as clearly shown in the drawings, so that the two members 3 and 4, and hence their jaws 5, may be moved toward and from each other. In the extreme outer end of the arm 7 of the member 4, which arm is of greater length than the other arm, 6, is formed a screw-threaded opening 11, in which is mounted an adjusting and set screw 12. The inner end of said screw is adapted to impinge against the member 3 and force the two members toward each other to cause their jaws 5 to enter between two adjacent teeth to force the latter apart and also to clamp the separator upon said teeth. Owing to the shape of the members and the disposition of the adjusting means or set-screw 12, it will be seen that the device will not in any way interfere with the operation of filling an approximal cavity in one of the teeth, and it will be noted that by simply loosening or tightening the set-screw 12 the separator may be quickly and easily applied or removed and that the teeth may be separated to any desired extent.

My improved matrix $2^a$ comprises a bar 15, which is adjustably mounted in recessed portions 16 of the member 4. This mounting is preferably effected by forming said bar with slots 17 and passing set-screws 18 through said slots and into threaded sockets formed in said member 4, so that when said set-screws 18 are loosened the said bar may be adjusted in the recessed portion 16 of said member, as clearly shown in Fig. 5 of the drawings. At each end of the bar 15 is formed a reduced head or bottom 19, which projects slightly beyond the body portion of the member 4 and is adjustably engaged with the ends of a metallic ribbon or strip 20. This adjustable connection is, as shown, effected by forming said ribbon or strip adjacent to its ends with longitudinally-disposed slots 21, through which said heads or buttons 19 project, as seen in Fig. 3 of the drawings. This metallic ribbon or strip is provided for the purpose of forming an artificial floor in an approximal cavity, the floor in the tooth having decayed away, and it is adjustably supported in the desired position upon the tooth or teeth by means of one or more set-screws 22. As shown in the drawings, I preferably provide two of said screws and pass them through threaded openings formed in the bar 15, so that their inner ends bear against the under side of the ribbon or strip 20 to force the same against the tooth or teeth. If desired, this metallic ribbon or strip instead of being disposed altogether beneath or upon the inner faces of the teeth, as shown in Fig. 1 of the drawings, may be passed between two of the teeth, so that one portion of it lies above or upon the upper or outer face of one of the teeth and its remaining portion extends beneath or upon the inner face of the other of the two separated teeth, as will be readily understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A tooth-separator comprising a pair of pivotally-connected members, means for forcing them toward and from each other, and a matrix carried by one of said members.

2. A tooth-separator comprising a pair of pivotally-connected members, means for forcing them toward and from each other, and an adjustable matrix carried by one of said members.

3. The combination with a tooth-separator, comprising pivotally-connected members and means for adjusting said members, of a matrix comprising a bar mounted upon one of said members, a flexible strip, and means for adjusting said strip, substantially as described and for the purpose set forth.

4. The combination with a tooth-separator, comprising pivotally-connected members and means for adjusting said members, of a matrix comprising a bar mounted upon one of said members, a metallic ribbon or strip adjustably engaged with said bar, and set-screws for adjusting said ribbon or strip.

In testimony whereof I have hereunto set my hand in presence of two subscribing witnesses.

FREEMAN DAVIS.

Witnesses:
   L. C. LEEPS,
   N. W. BURGHER.